June 1, 1965 S. A. WINGATE 3,187,187
PHOTOELECTRIC SHAFT ANGLE ENCODER
Filed Jan. 24, 1962

INVENTOR.
SIDNEY A. WINGATE
BY
Weingarten, Oronbuch & Pandiscio
ATTORNEYS

United States Patent Office 3,187,187
Patented June 1, 1965

3,187,187
PHOTOELECTRIC SHAFT ANGLE ENCODER
Sidney A. Wingate, Concord, Mass., assignor to Wayne George Corporation, Newton, Mass., a corporation of Massachusetts
Filed Jan. 24, 1962, Ser. No. 168,473
10 Claims. (Cl. 250—233)

This invention relates to photoelectric shaft encoders and more particularly to an improvement in incremental encoders.

Photoelectric shaft encoders are of two general types: (1) direct reading encoders which provide at each angular position a digital representation of that position and (2) incremental encoders which provide at each angular position a signal output which when added to previous outputs commencing with a zero reference point will yield a resultant signal representative of the angular position at which the last signal to be counted is generated. Although multi-track direct reading encoders have many attractive features and are generally resorted to in the first instance, it is recognized as a fundamental premise that however accurate a multi-track direct reading encoder may be made, a more accurate single track incremental encoder is possible. For this reason, single track incremental encoders are being given serious consideration where accuracy is the fundamental problem. There are many reasons why a single track incremental encoder may be made more accurate than a multi-track direct reading encoder. For one thing, the registration problem from track to track is a source of error in the direct reading encoder. Another source of error associated with direct reading encoders is attributable to small differences in the sensitivities of the readout photoelectric elements, generally photo diodes. Incremental encoders have a very significant advantage in that the single track may be read by an optical system comprised of a multiple slit, which allows the photoelectric elements to look at a large number of code elements simultaneously. This averaging effect greatly reduces the effects of small individual faults in elements in the code track and makes possible relatively high amplitude output signals. Nevertheless, there is a practical problem in making a high resolution incremental encoder which will operate satisfactorily and this problem is rooted in the fact that the output pulses must be counted in a digital counter in order to indicate absolute angle. This necessitates the counter being set to zero by use of an index signal which must be provided by the encoder at the zero-degree position of the shaft. Heretofore it has been difficult to provide a high intensity zero set signal with a high degree of resolution and accuracy and, for this reason, there has been reluctance to resort to incremental encoders even though they have the promise of greater accuracy than direct reading multiple track encoders.

Accordingly, the primary object of the present invention is to provide an incremental shaft angle encoder having means for initiating with great precision a zero position signal whereby the digital counter associated with the encoder may be reset to zero precisely at the zero-degree position of the shaft.

A more specific object of the present invention is to provide means on an incremental code disc for establishing a zero position signal which not only is accurate and reliable but which also has a relatively high intensity. The most obvious method of generating a very precise zero position signal is to provide a single element slit and a single element track on the code disc, which, upon coincidence, will provide illumination to a photoelectric element. The difficulty with this approach is simply that the signal would be much too small considering the allowable slit width in a high resolution encoder. This method is acceptable only where the quantum angle is large enough to allow the use of a reasonable width slit and disc code element. An alternative approach is to use a plurality of slits and a plurality of disc code elements which, upon coincidence, will establish a zero signal. The difficulty with this approach is that a signal will be established as soon as the slit and disc elements begin to overlap and successively higher amplitude signals will be generated as the overlapping increases, with a maximum amplitude being attained when all of the slit and code elements are in full coincidence with each other. The difficulty in discriminating between the successive signals so as to determine exactly when zero occurs can be overcome, but the cost, complexity, reliability, and response of the equipment which is required militates against adoption of this particular apporach. The present invention makes it possible to utilize a plurality of slits and code elements so as to obtain a zero signal of high intensity at the precise zero position but which are so arranged as to minimize the coincidence of slit elements and disc elements at all positions except the true zero position. This desired result is achieved by using staggered multiple slits on a stator member and staggered multiple code elements on the code disc. With proper slit and element staggering, a pattern can be achieved such that no more than one slit and one code element are coincident at all positions of the disc, except at one point where all the staggered code elements are all in registration with the staggered slits. This provides a high intensity light signal on the photoelectric element only at one position, namely, true zero position. At other angular positions of the code disc, the light signal on the photoelectric element will be non-existent or have a minimum intensity.

Other objects and many of the attendant advantages of the present invention will become more readily apparent as reference is had to the following detailed specification when considered together with the accompanying drawings wherein.

Figure 1:
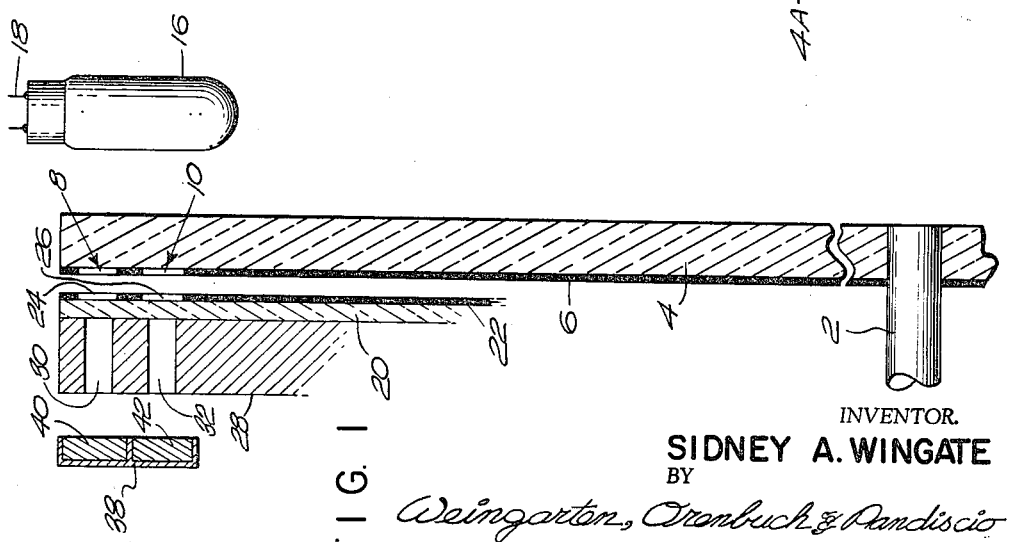
FIG. 1 is a fragmentary axial section of an encoder embodying the present invention.

As seen in FIG. 1, an encoder embodying the present invention essentially comprises a rotatable shaft 2 rotatably journaled in means not shown and adapted to be coupled to a rotatable member whose angular position is to be determined. The shaft 2 carries a code wheel 4 which is manufactured of a high quality, transparent glass and has provided on its lower surface an opaque, photographic coating 6 which, through controlled exposure and development, is provided with a circular incremental code track adjacent its periphery and also a zero position code track disposed inwardly of the incremental code track. The incremental code track is identified generally at 8 and the zero position code track is identified generally at 10. It is to be understood that the incremental code track comprises a series of alternately occurring opaque and transparent code elements, the opaque code elements being formed by virtue of the spacing between successive, transparent code elements. Zero position code elements are transparent and are spaced in a special arrangement described in greater detail hereinafter.

Positioned in proximity to the upper surface of the code wheel 4 is a lamp 16 having appropriate leads 18 for connecting it to a suitable power source (not shown) according to conventional methods. Also disposed in proximity to code wheel 4 but on the side opposite the lamp 16 is a stator plate 20 formed of essentially the same high quality glass as code wheel 4. The stator plate 20 has on its upper surface an opaque coating 22 in which are scribed a plurality of slits 24 located in radial alignment with the code track 8 and an additional series of slits 26 located in radial alignment with the zero position code elements 10. The spacing and width of slits 24 are identical to those of the code elements which make up code track 8. The spacing and width of slits 26 are identical to those of the elements which make up zero position code track 10. The radial lengths of slits 24 and 26 are approximately the same as the corresponding dimensions of the elements of tracks 8 and 10 respectively.

Located below and attached to the stator plate 20 is a stationary plate 28 preferably formed of metal. Plate 28 is commonly identified as a station separator by virtue of having two holes 30 and 32 in line with slits 24 and 26 respectively. The hole 30 is coextensive with, i.e. extends across, the entire series of slits 24, thereby collimating light which may be transmitted through the code track 8 and the slits 24. Hole 32 likewise extends across slits 26, thereby collimating light which may pass through track 10 and slits 26.

Located below the station separator plate 28 is a photocell assembly identified diagrammatically at 38. In the present case, this photocell assembly comprises two adjacent photocells 40 and 42 mounted in center line registration with the separator holes 30 and 32 respectively. It is to be observed that the radial dimensions of cells 40 and 42 are such that the light beam collimated by hole 30 will impinge only on cell 40 while the light collimated by hole 32 will impinge only on cell 42. The photocells 40 and 42 have leads 46 for connecting them to appropriate external circuitry. In the case of photocell 40, it will be connected via suitable amplifier means to a pulse shaping and counting circuit. In the case of photocell 42, it will be connected via an appropriate amplifier to a counter-reset circuit which in combination with the output of the photocell 40 will produce an output which is used to reset the aforesaid counting circuit to zero.

In accordance with the foregoing description, it is believed to be apparent that with the lamp 16 energized and the code wheel 4 rotating, photocell 40 will be subjected to a series of light pulses, the rate of occurrence of the light pulses depending upon the speed of rotation of the code wheel. The light pulses result from the fact that as the code wheel advances, the opaque code segments will act as shutters, each one blocking off light when it is in registration with a slit 24. These pulses will occur so long as the code wheel is rotating. When the code wheel is at rest, the photocells will see continuous light or continuous shadow.

By counting the number of pulses, it is possible to determine the angle through which the code wheel rotates. By reference to a zero reference point it is possible to derive from the number of pulses counted the absolute position of the code wheel at any time. The purpose of code segments 10 is to make possible the generation of a counter reset signal each time the code wheel passes through a predetermined zero position. The counter reset signal will reset the counter instantaneously at zero position so that any subsequent count will always be relative to zero.

Generation of the reset signal at precisely zero position is achieved by spacing the zero position code elements according to a preselected number series and by spacing the slit elements 26 according to the same number series. In the embodiment shown in FIG. 2, the transparent code elements are arranged according to the number series, 2, 3, 4, 6, 8, 12, 16, 24, 32, 48, 64, etc. This means that, with reference to the transparent zero position code elements shown at 10 in FIG. 2, the leading edge of the second code element (reading from left to right) is spaced two code segments away from the corresponding edge of the first code element, the leading edge of the third code element is spaced three code elements away from the leading edge of the second code element, the leading edge of the fourth code element is spaced four code elements away from the leading edge of the third code element, and the leading edge of the fifth code element is spaced six code elements away from the leading edge of the fourth code element. As indicated previously the stator plate slits 26 are spaced identically to the zero position code elements. With this arrangement no more than one zero position code element can line up with any slit element 26 at any position, with the single exception of zero degree position. At zero degree position, all of the zero position code elements will line up with all of the slit elements 26. Thus, at all angular positions except zero degree position, the light received by the photocell 42 will be limited to that amount of light which can be derived via a single slit 26. At zero degree position the light received by photocell 42 will be determined by the light which can be derived via all of the slits 26. Therefore, since the amplitude of the output signal of photocell 42 will vary according to the light which it sees, the output signal generated by said photocell will shift sharply at zero degree position, being distictly greater in amplitude at that one position than at any other. The difference in amplitude may be increased by increasing the number of zero position code elements and the number of slits 26. Preferably the total number of slits 26 will be the same or nearly the same as the number of slits 24 so that the amount of light received by photocell 42 at zero degree position will be substantially the same as the maximum light received by photocell 40. Such an arrangement permits the convenience of using identical output amplifiers (not shown) for the two photocells.

Figure 2:
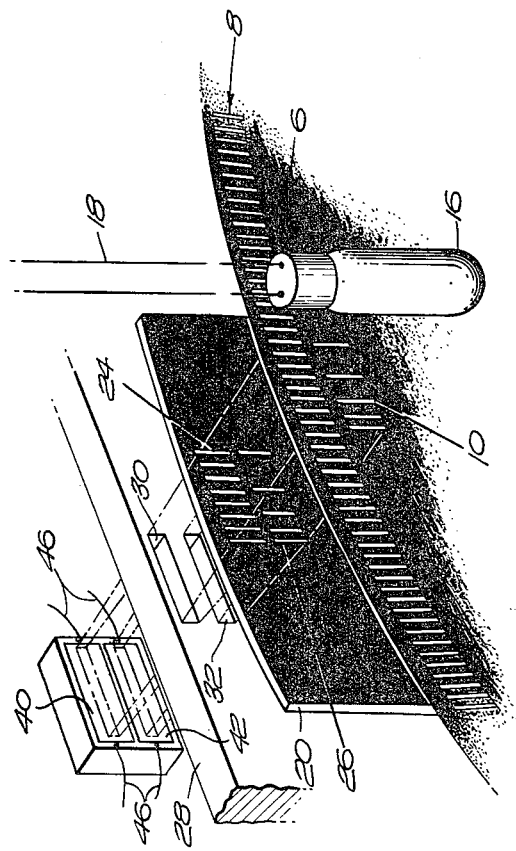
FIG. 2 is a fragmentary perspective view of a portion of an incremental encoder code wheel and elements of the photoelectric optical system.
Figure 3:
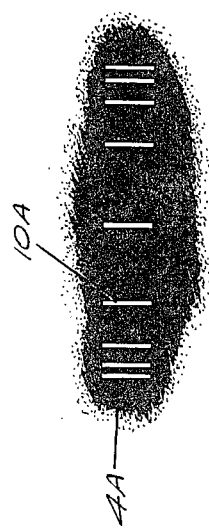
FIG. 3 illustrates a modification of the present invention.

It is to be observed that the series of zero code elements and the series of associated slits 26 may extend oppositely from the direction shown in FIG. 2. In fact, the series may extend in both directions simultaneously as shown in FIG. 3 which illustrates a fragment of a code wheel 4A having two series of staggered transparent code elements 10A extending in both directions toward a selected point occupied by a code element common to both series. The spacing between successive code elements is the same in both directions, reflecting the aforesaid number series wherein the spacing between any zero code element and the code element immediately preceding it is twice the length of the spacing between the $(n-2)$th code element and the code element immediately preceding said $(n-2)$th code element, where $n$ is the number of the code element starting with the first. When using the arrangement of FIG. 3 on both the code wheel and the stator plate, a maximum of two zero position code elements and two slits 26 can be aligned at any time when the code wheel is not at zero degree position. At zero degree position, all of the code elements and slits will be aligned. The advantage of the embodiment of FIG. 3 is that it makes possible a greater amount of light over a given circumferential dimension than is possible with the single series arrangement of FIG. 2. While the maximum light at positions other than zero also increases, the ratio of the light at full alignment with said maximum light does not decrease appreciably. Therefore, the change in light intensity in moving into or out of zero position is of greater magnitude and a sharper rise is possible than with the embodiment of FIG. 2. As a consequence, the zero output signal will be easier to detect and process.

It is believed to be apparent from the foregoing description that the present invention makes it possible to generate an unambiguous zero signal at precisely zero position. The difference in magnitude between the signals generated at all positions other than zero degree position and the zero degree position is sufficiently great as to permit ready discrimination of the zero position signal.

As indicated previously, the amplitude of the zero position signal may be increased by increasing the number of zero position code elements and also the number of slits 26.

The invention also makes it possible to generate reference signals at positions other than zero degrees. Thus, it may be desired to generate a reference signal at the beginning of each quadrant of the code wheel. In such a case, the zero position code track 10 would be repeated at four difference positions on the code wheel. No changes would be required in the stator plate 20 or station separator 28. With this arrangement, each group of zero position code elements in turn would generate a reference signal when it is in full registration with the slits 26. The present invention also makes it possible to generate signals of progressively greater amplitude at successive angles. This can be achieved by having four groups of zero position code elements arranged, for example, as follows: at the 90° position, three zero position code elements; at the 180° position, six zero position code elements; at the 270° position, nine zero position elements 10; and at the 360° position, twelve zero position code elements. The number slits 26 would also equal twelve. With such an arrangement the quantities of light which would be incident upon the photocell 42 at 90, 180, 270 and 360 degrees would differ by equal increments. Thus, the corresponding signal outputs from photocell 42 would differ in a stepwise manner so that, by discriminating according to the amplitudes of the outputs, it would be possible to determine precisely when the angular position of the code wheel is 90, 180, 270 or 360 degrees, without resorting to a counter. Other methods may be employed to discriminate between successive reference points. Thus, for example, gate tracks may be provided on the code disc for the purpose of generating gating signals which may logically combine to distinguish reference signals from each other.

Although the aforesaid number series 2, 3, 4, 6, 8, 12, 16, 24, etc. is quite satisfactory for the invention, it is not the preferred number series. Currently this distinction belongs to the number series 2, 3, 4, 6, 8, 11, 16, 17, 20, 22, 24, etc. where the numbers represent the spacings (in terms of zero position code element widths) between the leading edges of successive zero position code elements no spacing between any two successive code elements being equal to any other spacing or equal to the sum of any group of immediately successive spacings. Thus, for example, since the only possible sum of the first two spacings is five, no subsequent pair of adjacent code elements may be separated by two, three, or five element widths. Similarly, since the possible sums of the first three spacings are five (=3+2), seven (=4+3) and nine (=4+3+2), no subsequent pair of adjacent code elements may be separated by two, three, four, five, seven or nine element witdhs. This preferred number series and the number series 2, 3, 4, 6, 8, 12, 16, 24, etc. are alike in the sense that the maximum quantity of light incident on photocell 42 at code wheel positions other than zero is $1/n$, where $n$ is the quantity incident at zero position. However, the preferred number series is more economical from a space standpoint. Thus, for example, nine zero position elements or slits require a shorter circumferential distance when arranged according to the preferred series than the series, 2, 3, 4, 6, 8, 12, 16, 24, etc.

Notwithstanding the fact that the two aforesaid number series are especially satisfactory, it is to be understood that the invention need not be restricted thereto and that the zero position code elements and the slits associated therewith may be arranged according to some other number series. The essential requirement is that the selected number series result in a staggered array of zero position code elements (and slits) so as to achieve a satisfactory high contrast in incident illumination between the zero position and all other positions without an excessive overall spacing for the code elements and slits. What constitutes a satisfactory high contrast may be considerably less than the aforesaid $1/n$, depending upon the specified requirements of the encoder. Thus, it may be desirable to utilize a number series wherein no more than fifty percent of the zero code elements will be aligned with zero slits at positions other than zero degree position, with total alignment occurring at zero degree position.

It is to be understood that the term "zero position" as used herein means a fixed or predetermined reference position. It also is to be noted that the term "photocell" is used herein in a general sense and includes any convenient type of light responsive element suitable for use in an optical encoder.

Obviously, the present invention is susceptible of many changes and additions without departing from the principles thereof. Thus, for example, the elongated holes 30 and 32 in the station separator 28 may be replaced by a plurality of small circular holes, each in alignment with a single slit in the stator plate 20. Similarly, the code wheel could include other code tracks or the relative position of the incremental code track 8 and the zero position code track 10 could be reversed (with corresponding reversal of other parts where necessary). It is further contemplated that the principles of this invention are directly applicable to electrostatic and magnetic encoders, in which case the code wheel would have electrostatic or magnetic code elements and the optical system and the photocells would be replaced by functionally equivalent electrostatic and magnetic sensing systems. Accordingly, the present invention is not to be restricted to the specific details herein described or illustrated but is to be limited only by the following claims.

What is claimed is:

1. In an optical shaft angle encoder having an optical code disc with an array of opaque and transparent code elements, means for projecting light through said disc at a selected point, and means including a first photoelectric unit for generating output signals in response to light admitted through said disc and detected by said photoelectric unit, the combination comprising means for supporting said disc for rotational motion relative to said first-mentioned means and said second-mentioned means for precisely determining when said disc has reached a predetermined angular position, said system comprising a stator plate having a plurality of slits, a plurality of transparent zero code elements on said disc, each of said zero code elements and each of said slits being extremely narrow transversely in order that certain minute relative motions transversely between said zero code elements and said slits result in large proportional changes in the quantity of light capable of passing through both said zero code elements and said slits as a function of said minute relative motions, said slits staggered with unequal spacing therebetween, said zero code elements staggered with the same unequal spacing therebetween, and means including a second photoelectric unit for generating an output reference signal in response to light passing through both said slits and said zero code elements, the quantity of light detected by said second photoelectric unit having a value at or below a predetermined relatively small threshold value at all but one position of said code disc and having a value exceeding said threshold value by a relatively large amount at said one position, said one position being when said slits and zero code elements are in maximum registration with each other.

2. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said disc for rotational motion relative to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, each of said code elements and each of said slits being extremely narrow transversely in order that certain minute relative motions transversely between said code elements and said slits result in large proportional changes in the quantity of light capable of passing through both said code elements and said slits as a function of said minute relative motions.

3. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, said slits being staggered in one direction from a selected reference point.

4. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, said slits being staggered in two directions from a selected reference point.

5. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, said zero code elements being staggered in one direction from a given reference point.

6. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, said zero code elements being staggered in two directions from a given reference point.

7. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, the spacing of successive zero position code elements being according to the mathematical series 2, 3, 4, 6, 8, 12, 16, 24, etc.

8. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, the spacing of said slits being according to the mathematical series 2, 3, 4, 6, 8, 12, 16, 24, etc.

9. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, the spacing of successive zero position code elements being according to the mathematical series 2, 3, 4, 6, 8, 11, 16, 17, 20, 22, 24, etc.

10. An optical shaft angle encoder comprising a code disc with an array of optical code elements, means for projecting light through said disc at a selected point, means including a first photoelectric unit for generating output signals at successive shaft angle positions in response to light transmitted through said disc, a plurality of transparent zero code elements on said disc, said code elements staggered with unequal spacing therebetween, a stator plate having a plurality of slits, means for supporting said code disc for rotational motion with respect to said stator plate, said slits also staggered whereby said slits and zero position code elements will have maximum registration at a predetermined maximum number of shaft positions and will have minimum registration at other shaft positions, and means including a second photoelectric unit for generating an output reference signal in response to the light passing through said slits and said zero position code elements, the quantity of light detected by said second photoelectric unit varying in accordance with the degree of registration of said slits and said zero position code elements, the spacing of said slits being according to the mathematical series 2, 3, 4, 6, 8, 11, 16, 17, 20, 22, 24, etc.

References Cited by the Examiner
UNITED STATES PATENTS

| | | | |
|---|---|---|---|
| 2,659,072 | 11/53 | Coales et al. | 340—347 |
| 2,679,644 | 5/54 | Lippel et al. | 340—347 |
| 2,762,290 | 9/56 | Moss et al. | 250—233 X |
| 2,795,705 | 6/57 | Rabinow | 250—237 X |
| 3,024,986 | 3/62 | Strianese et al. | 250—233 X |
| 3,054,901 | 9/62 | Davidson | 250—233 |

RALPH G. NILSON, *Primary Examiner.*

WALTER STOLWEIN, *Examiner.*